United States Patent
Gopalakrishnan

(10) Patent No.: US 8,156,010 B2
(45) Date of Patent: Apr. 10, 2012

(54) MULTIMODAL CONTEXT MARKETPLACE

(75) Inventor: Kumar C. Gopalakrishnan, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1510 days.

(21) Appl. No.: 11/423,264

(22) Filed: Jun. 9, 2006

(65) Prior Publication Data

US 2006/0247998 A1 Nov. 2, 2006

Related U.S. Application Data

(63) Continuation-in-part of application No. 11/215,601, filed on Aug. 30, 2005.

(60) Provisional application No. 60/689,345, filed on Jun. 10, 2005, provisional application No. 60/689,613, filed on Jun. 10, 2005, provisional application No. 60/689,618, filed on Jun. 10, 2005, provisional application No. 60/689,741, filed on Jun. 10, 2005, provisional application No. 60/689,743, filed on Jun. 10, 2005, provisional application No. 60/606,282, filed on Aug. 31, 2004.

(51) Int. Cl.
*G06Q 30/00* (2006.01)

(52) U.S. Cl. ........... 705/26.3; 705/27.1; 705/37

(58) Field of Classification Search .......... 705/26, 705/27, 37
See application file for complete search history.

(56) References Cited

U.S. PATENT DOCUMENTS

| | | | |
|---|---|---|---|
| 6,236,971 B1 * | 5/2001 | Stefik et al. | 705/1 |
| 6,985,885 B1 * | 1/2006 | Goldberg et al. | 705/37 |
| 7,565,137 B2 * | 7/2009 | Shaw et al. | 455/414.3 |
| 2004/0082319 A1 * | 4/2004 | Shaw et al. | 455/414.1 |

OTHER PUBLICATIONS

PR Newswire: Kanoodle Launches LocalTarget™ . . . , Mar. 7, 2005; Proquest #804049601, 3pgs.*
Raisinghani, Mahesh; "Search Engine Technology: A closer loot at its future," Information Resources Management Journal, Apr.-Jun. 2005, v18i2pg1; Proquest #806361231, 7pgs.*
Business Wire: "Emerging Online Advertising Company . . . ," Jan. 11, 2005; Proquest #777427991, 3pgs.*

* cited by examiner

*Primary Examiner* — Robert M. Pond
(74) *Attorney, Agent, or Firm* — Blakely, Sokoloff, Taylor & Zafman LLP

(57) ABSTRACT

A method and system for trading of rights to associate information services with multimodal contexts is described. Also described are methods for associating financial transactions with trading of rights in the marketplace and determining the value of the financial transactions. Also described are user interfaces for trading on the marketplace.

20 Claims, 13 Drawing Sheets

| Context | Constituents | | | | |
|---|---|---|---|---|---|
| Context 1 | Primary Data 1 | Implicit Data 1 | Meta Data 1 | | |
| Context 2 | Primary Data 1 | Primary Data 2 | Implicit Data 1 | Meta Data 1 | Meta Data 2 |
| Context 3 | Primary Data 1 | Primary Data 2 | Implicit Data 1 | Meta Data 1 | Meta Data 2 | Meta Data 3 |
| Example 1 | Image 1 | "Text abc" | 5/1/5 | UserGroup1 | |

Fig. 1

| Context | Information Service | Type | Pricing |
|---|---|---|---|
| Context 1 | Information Service 1 | Free | N/A |
| Context 1 | Information Service 2 | Commercial | $ 1.00 |
| Context 2 | Information Service 3 | Sponsored | Max $ 0.25 |

Fig. 2

MULTIMODAL CONTEXT MARKETPLACE

CROSS-REFERENCE TO RELATED APPLICATIONS

This application claims the benefit of U.S. provisional patent applications 60/689,345, 60/689,613, 60/689,618, 60/689,741, and 60/689,743, all filed Jun. 10, 2005, and is a continuation in part of U.S. patent application Ser. No. 11/215,601, filed Aug. 30, 2005, which claims the benefit of U.S. provisional patent application 60/606,282, filed Aug. 31, 2004. These applications are incorporated by reference along with any references cited in this application.

BACKGROUND OF THE INVENTION

The present invention relates generally to a marketplace for trading of rights. More specifically, a system and method for trading rights to associate information services with multimodal contexts is described.

Trading systems for physical property have existed for a long time. The creation of educational institutions introduced the concept of commercial trade of abstract entities such as information and knowledge. The advent of computer information systems further enabled instantaneous and efficient trading of physical and information goods. Computerized trading systems in use include auction marketplaces for physical goods, hotel reservations and air tickets. In addition, auction marketplaces have also been used for providing abstract entities such as sponsored information relevant to Web search keywords. However, a marketplace for providing information services related to multimodal information, is in order.

BRIEF SUMMARY OF THE INVENTION

A method and system for operating a marketplace for the rights to associate information services with multimodal contexts is presented. Multimodal contexts refer to contexts generated from multimodal information sources including multimedia content, associated metadata, user inputs and knowledge from knowledgebases. The marketplace enables the trading of the rights to associate information services with multimodal contexts. Transactions in the marketplace may optionally be accompanied by financial transactions. The value of the financial transactions may be determined by fixed or dynamic pricing models. In addition, the transactions in the marketplace may also be accompanied by financial compensation of the operators of the marketplace and providers of parts of the multimodal contexts.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 1 illustrates an exemplary context definition table structure, in accordance with an embodiment.

FIG. 2 illustrates an exemplary context-information service mapping table structure, in accordance with an embodiment.

FIG. 5($b$) illustrates an exemplary process for providing information services from the marketplace, in accordance with an embodiment.

DETAILED DESCRIPTION OF THE INVENTION

Figure 3:
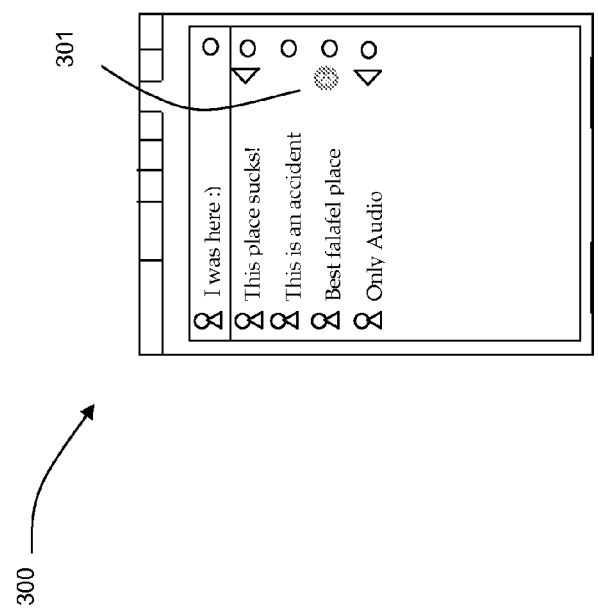
FIG. 3 illustrates an exemplary user interface for consuming information services, in accordance with an embodiment.

Various embodiments may be implemented in numerous ways, including as a system, a process, an apparatus, or a series of program instructions on a computer readable medium such as a computer readable storage medium or a computer network where the program instructions are sent over optical, electrical, electronic, or electromagnetic communication links. In general, the steps of disclosed processes may be performed in an arbitrary order, unless otherwise provided in the claims.

A system and method are described for trading rights to associate information services with multimodal contexts that are used as a basis for providing the information services. The specific embodiments described in this document represent exemplary instances of the present invention, and are illustrative in nature rather than restrictive.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" or "some embodiments" means that a particular feature, structure, or characteristic described in connection with the embodiment is included in at least one embodiment of the invention. The appearances of the phrase "in one embodiment" or "some embodiments" in various places in the specification are not necessarily all referring to the same embodiment, nor are separate or alternative embodiments mutually exclusive of other embodiments. Features and aspects of various embodiments may be integrated into other embodiments, and embodiments illustrated in this document may be implemented without all of the features or aspects illustrated or described.

Various embodiments enable the trading of rights to associate information services with multimodal contexts that are used as a basis for providing the information services. The multimodal contexts are constituted from one or more multimodal information such as primary data, implicit data, and metadata together termed as "context constituents." The context constituents may be in the form of audio, video, graphics, temperature, pressure, and other media types. The contexts thus constituted may have one or more information services associated with them. The various embodiments described provide a mechanism in the form of a marketplace for trading the rights to associate the information services with such contexts.

Primary data refers to information in audio, visual, textual, and graphical formats generated in conjunction with each other or independent of each other but which potentially communicate information on their own. Examples of primary data include visual imagery, speech audio data, computer graphics, textual information, alphanumeric user input, the history of users' usage of the information services, classifications of the information services, membership data for various user groups using the information services, profiles of users of the information services, explicitly specified preferences of the users of the information services, explicitly specified features and capabilities of devices used to access information services, explicitly specified characteristics of the environment and information from other knowledge bases containing specialized knowledge on various domains such as a database of logos, an electronic thesaurus, a database of the grammar, syntax and semantics of languages, knowledge bases of domain specific ontologies or a geographic information system (GIS) or parameters to setup a communication service such as email or SMS. The term "visual imagery" refers to multimedia content in the form of a single still image, a plurality of still images, a single video sequence, a plurality of video sequences, or a combination thereof.

Metadata refers to information that qualifies the primary data and does not bear significant value on its own, i.e., metadata is data about primary data. Examples include the time and location of capture of the primary data, the time and location of the last modification of the primary data, the temperature and atmospheric pressure at the location of capture of the primary data, the authors of the primary data, contributors to the primary data such as scripts writers, directors, musicians and actors, the location and the time for accessing the primary data, the commercial or sponsored nature of the information services, the value of financial transactions associated with commercial or sponsored primary information services, the access rights for users to the primary data and knowledge derived from it, user access privileges for the information services, explicitly specified popularity of information services and explicitly specified popularity of the authors contributing information services.

Implicit data refers to information that is embedded in the multimodal input information. Implicit data extracted from audio primary data includes the textual representation of speech embedded in the audio data, identifying information for the speaker whose speech is embedded in the audio data, the intonation and mood of the speaker whose speech is embedded in the audio data, musical notes representing the music embedded in the audio data and identifying information for music embedded in the audio data.

Implicit data extracted from visual primary data such as still images or video includes the textual representation of any text embedded in the visual data, the formatting information for any text embedded in the visual data such as the color, font, emphasis and layout of the text, identifying information for any logos or symbols embedded in the visual data, graphical marks that are embedded in the visual data, identifying information for other objects present in the visual data such as people, buildings, etc and characteristics of the visual imagery such as color histogram, brightness and contrast.

In addition, any audio data that accompanies the video data might be used to extract implicit data as described earlier. Other examples of implicit data include learned popularity of information services, learned popularity of the authors contributing information services, learned features and capabilities of devices used to access information services, learned preferences of the users of the information services and learned characteristics of the environment. The learned implicit data may be learned through automatic computer analysis or human aided computer analysis of users' usage of the information services.

The multimodal information used as input to provide information services may be sourced in real time, as it is generated, as in the case of weather telemetry or video camera feeds. The multimodal input information may also be sourced from storage infrastructure such as multimedia databases or domain specific multimedia knowledge bases. The databases and knowledge bases used may be internal to the system, or external to the system as in the case of the World Wide Web or the user's personal computer.

In the scope of this description, an implementation of the marketplace is referred to as the "system." In the scope of this description, the term "information service" is used to refer to a user experience provided by the system that may include (1) the logic to present the user experience, (2) multimedia content, and (3) related user interfaces. The term "content" is used to refer to multimedia data used in the information services. "Databases" are defined as collections of data while "knowledge bases" are defined as collections of data in conjunction with information that provide syntactical and semantic structure to the data in the collection and logic for interpreting the data in the collection and its structure. For instance, a collection of words in the English language is classified as a database while a collection of words in the English language and their usage syntax and semantics, i.e., the rules of English language grammar, together would form a knowledge base. The term "operator" refers to an individual or business entity that operates a system as described below.

The goods traded in the marketplace created by the system are the rights to associate information services with multimodal contexts. The trading of the rights to associate information services with multimodal contexts is termed a "transaction." The marketplace has two kinds of participants: producers that provide the goods to the marketplace and consumers that consume goods from the marketplace. The participants in the marketplace may either be an individual or a business entity. The transaction of a good in the marketplace from a producer to the consumer may be accompanied by a financial transaction. The value of the financial transaction may include an intrinsic value of the good, an extrinsic value of the good and a price for enabling and operating the marketplace.

The intrinsic value of the good in this marketplace is a price for generating and providing an information service by the producer of the information service. The extrinsic value of the good in the marketplace is a price for ensuring the privilege of associating an information service with a context by the operator of the marketplace. The value of the associated financial transaction may be used to prioritize the consumption of the information services. For instance, information services with greater associated financial transaction values may be provided to a consumer before information services with lesser associated financial transaction values. The financial transaction accompanying a transaction in the marketplace may be compensatory where the consumer pays the producer or complimentary where the producer pays the consumer or a combination of both.

The association of an information service with a context sets up a transaction which may be completed when the information service is consumed by obtaining it from the marketplace and used by a device or service. The device or service may use the information service obtained from the marketplace to provide it to a human end-user for consumption or use it for further processing as part of the device or service.

In the scope of this document, the term "nature of the producer" refers to characteristics of a producer such as the legal status of the producer, the service agreements between the producer and the operator of the system, the physical location of the producer, the quality of information services provided by the producer, the popularity of information services provided by the producer, the history of legal and business relationships between the producer and the operator of the system and the credit rating of the producer, time of the producer's transactions in the system, time of use of information services provided by the producer, location of use of information services provided by the producer, demographic information (e.g., age, sex) of users of information services provided by the producer, frequency of usage of marketplace by the producer and financial value associate with information services provided by producer.

Examples of the legal status of the producer include individuals and corporation. Examples of service agreements between the producer and the operator of the system include any preferred producer benefits or discount programs. Examples of the physical location of the producer include the country of location of the producer. Examples of metrics for quality of information services provided by a producer include the language sophistication used to author the textual content in the information services, the clarity of audio content and the clear identification of adult content.

Examples of metrics for the popularity of information services provided by a producer include the frequency with which information services provided by the producer are accessed by consumers and the time spent by consumers using the information services provided by the producer. Examples of the history of legal and business relationships between the producer and the operator of the system include any past legal conflicts between the producer and the operator of the system and non-payment of dues from the producer to the operator of the system or vice versa. Examples of credit rating of the producer include credit rating for individuals and businesses provided by various credit rating agencies.

In the scope of this document, the term "nature of the consumer" refers to characteristics of a consumer such as the legal status of the consumer, the service agreements between the consumer and the operator of the system, the physical location of the consumer, the quality of information services consumed by the consumer, the popularity of information services consumed by the consumer, the history of legal and business relationships between the consumer and the operator of the system and the credit rating of the consumer, time of the consumer's transactions in the system, time of use of information services by the consumer, location of use of information services by the consumer, demographic information (e.g., age, sex) of consumer, frequency of usage of marketplace by the consumer and financial value of information services used by the consumer.

Examples of the legal status of the consumer include individuals and corporation. Examples of service agreements between the consumer and the operator of the system include any preferred consumer benefits or discount programs. Examples of the physical location of the consumer include the country of location of the consumer. Examples of metrics for quality of information services typically consumed by a consumer include the clarity of audio content and the resolution of video content. Examples of metrics for the popularity of information services typically consumed by a consumer include the frequency with which information services consumed by the consumer are accessed by other consumers. Examples of the history of legal and business relationships between the consumer and the operator of the system include any past legal conflicts between the consumer and the operator of the system and non-payment of dues from the consumer to the operator of the system or vice versa. Examples of credit rating of the consumer include credit rating for individuals and businesses provided by various credit rating agencies.

An information service for which a consumer pays for is termed a "commercial" information service while an information service for which a producer pays for is termed a "sponsored" information service. "Regular" information services are information services that do not have a financial transaction associated with their usage. However, regular information services may optionally have a commercial transaction embedded in them i.e., it is possible to use at least parts of the regular information service without having to complete a commercial transaction. Information services provided by the system may also incorporate a combination of sponsored, commercial and regular information services features such that parts of the information services are paid for by the producer or consumer or are provided free of charge.

The monetary value associated with a good i.e., the value of the financial transaction accompanying a transaction (i.e., trade) in the marketplace (for the rights to associate an information service with a context), is determined either using a static or dynamic pricing model. In a static pricing model, the price of an information service is a fixed value. In the case of a dynamic pricing model such as an auction-based pricing model, the price of an information service is determined based on criteria such as the price other producers interested in associating their information services with the specific context are willing to pay for the association, the nature of the producer of the good, the nature of the consumer of the good, the number of producers of similar goods (i.e., the number of users interested in associating their information services with a specific context), the number of consumers of similar goods (i.e., the number of users interested in consuming information services associated with a specific context), the time of the transaction, the location of the transaction, the media type of the information service such as audio, visual, textual or graphical content, the cost of delivering the information service, the intrinsic value of the information service, required urgency of delivery of the information service and the presence of any commercial transactions embedded in the information service.

In some embodiments, the dynamic pricing model uses a reverse auction scheme where the consumers of a good offer to buy the good at a certain price, upon which multiple producers of the good might compete to provide the good. The consumer may also optionally change his offer price to ensure a successful transaction. This reverse auction pricing model especially applies to commercial information services. In providing information services related to a context, the monetary value of the good may be used as one of the factors for computing the relevancy of the associated information service to a specific context. Dynamic pricing models may be used when a plurality of information services are available for association with a context.

The operators of the marketplace manage the financial transactions that accompany the trades in the marketplace. The operators may optionally be compensated for managing the marketplace with a fee corresponding to each trade termed a "service fee." The service fee is determined either based on a static pricing model or a dynamic pricing model. In the case of static pricing model, the service fee is a fixed value per transaction or a fixed fraction of the transaction value.

In the case of a dynamic pricing model, the service fee is determined based on criteria such as the value of the financial transaction, the service fee charged by operators of other similar marketplaces, the nature of the producer of the good, the nature of the consumer of the good, the number of producers of similar goods (i.e., the number of users interested in associating their information services with a specific context), the number of consumers of similar goods (i.e., the number of users interested in consuming information services associated with a specific context), the time of the transaction, the location of the transaction, the media type of the information service such as audio, visual, textual or graphical content, the cost of delivering the information service, the intrinsic value of the information service, the required urgency of delivery of the information service and the presence of any commercial transactions embedded in the information service.

A transaction in the marketplace may also optionally be accompanied by compensation of the providers of the context constituents which are used to provide the information service. For example, a newspaper publisher may get compensated with a fraction of the financial transaction for publishing a news article that serves as a context. The compensation may be determined using a fixed price pricing model, as a constant value or as a constant fraction of the financial transaction. The compensation may also be determined using a dynamic pricing model based on parameters such as the value of the financial transaction, the service fee charged by operators of the marketplace, the nature of the producer of the good, the nature of the consumer of the good, the number of producers of similar goods (i.e., the number of users interested in associating their information services with a specific context), the number of consumers of similar goods (i.e., the number of users interested in consuming information services associated with a specific context), the time of the transaction, the location of the transaction, the media type of the information service such as audio, visual, textual or graphical content, the cost of delivering the information service, the intrinsic value of the information service, the urgency of delivery of the information service and any commercial transactions embedded in the information service.

The system also incorporates AAA (authentication, authorization, and accounting) features to ensure that access to information services can be restricted by the producers of the information services, the consumers of the information services or the operators of the system. The accounting functionality of the AAA features enables the accounting of the financial transactions and billing of the appropriate parties for usage of the system. The billing may require the bill recipient to pay for the usage of the system. The billing may also optionally compensate the bill recipient for providing commercial information services through the system.

In some embodiments, the system is implemented using a database driven computer information system. The database termed the "marketplace database" maintains a list of contexts, each comprised of a plurality of primary data, implicit data and metadata, which are defined automatically by the system or manually by users of the system. In some embodiments, the marketplace database may be distributed over a plurality of databases. In some embodiments, the system includes recognition engines designed to extract implicit data from multimodal information. Examples of such recognition engines include text recognition engine, visual layout recognition engine, generalized visual recognition engine and speech recognition engine. In some embodiments, the computer system may use databases and recognition engines resident on information systems external to the system.

FIG. 1 illustrates the structure of an exemplary context definition table in the marketplace database. The database also includes a list of information services associated with each specific context, their providers, the pricing model, and access rights for the AAA mechanism.

FIG. 2 illustrates the structure of an exemplary context-information services mapping table used in the marketplace database. Contexts in the context-information services mapping table may have a corresponding definition in the context definition table. A context may have more than one information service associated with it. Similarly, an information service may be associated with more than one context in the marketplace.

The producers and consumers may interact with the system remotely through user interfaces such as a personal computer based Web browser or a portable device such as a mobile phone.

FIG. 3 illustrates the user interface of an embodiment for consuming the information services on a mobile phone. The available choice of information services is presented as a list. The list includes a commercial information service 301 with the "$" icon in the listing.

Figure 4:
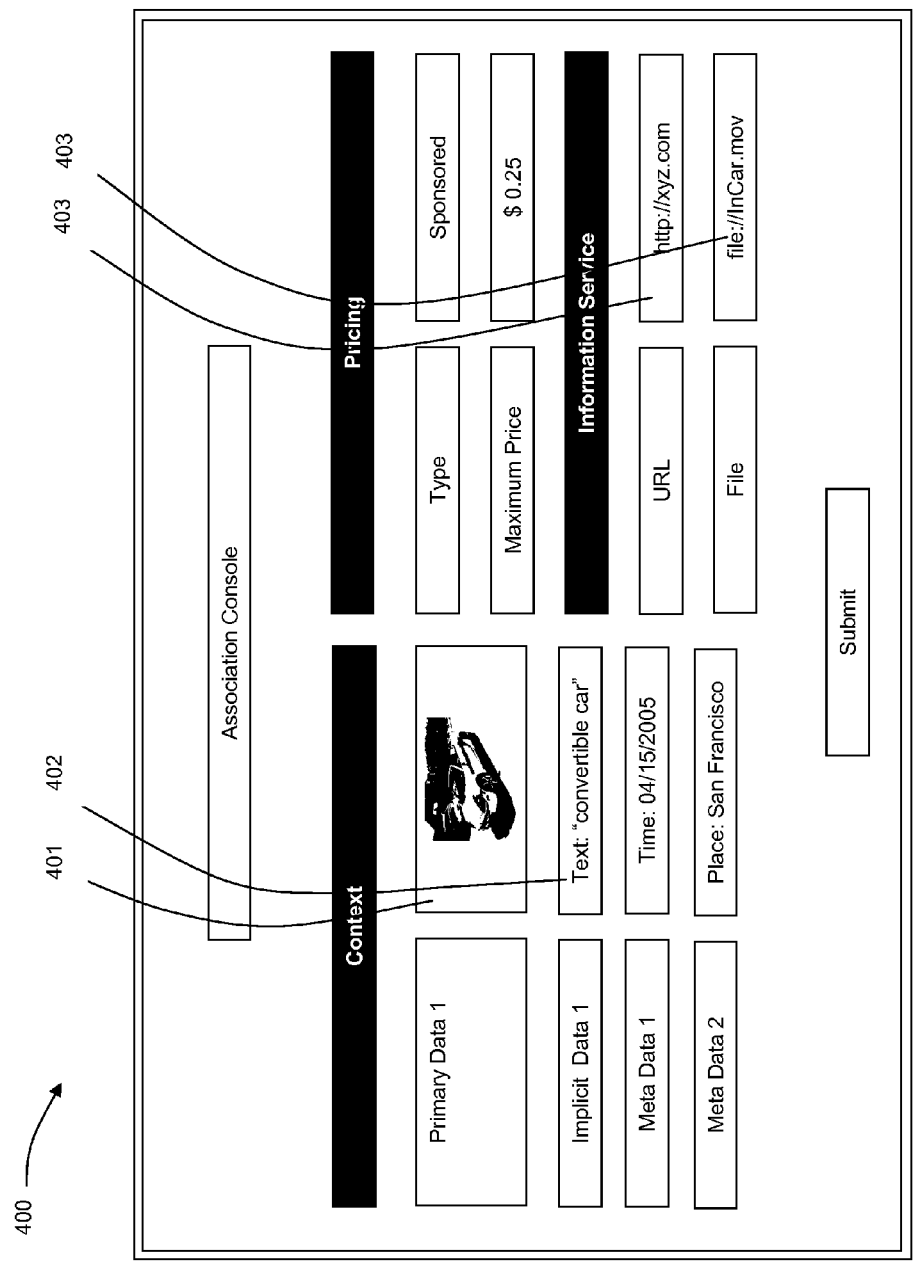
FIG. 4 illustrates an exemplary user interface for managing context-information service associations, in accordance with an embodiment.

FIG. 4 illustrates the user interface of an embodiment for managing the association of information services with contexts. A producer of information services may request the association of an information service with a specific context using the user interface. For instance, a producer may specify an information service using URLs to relevant online content 403 or paths of files stored in the system 404 may be entered into corresponding text fields adjacent to a list of contexts. The producer may also input a context for association with an information service by specifying the context constituents.

For instance, the producer may input primary data in the form of an image 401 which is then analyzed by the system to extract the embedded implicit data 402 in the form of text. If providing a sponsored information service, the producer specifies the fixed price that he is willing to pay for providing the sponsored information service in case of a static pricing model or the maximum price he is willing to pay for providing the sponsored information service in case of a dynamic pricing model.

If providing a commercial information service, the producer specifies the fixed price to be paid by a consumer for using the commercial information service in case of a static pricing model or the minimum price for which he is willing to provide the commercial information service in case of a dynamic pricing model. Optionally, the user interface may provide tools, components and content for authoring information services which can then be associated with contexts.

The user interface illustrated in FIG. 4 is appropriate for presentation on a full featured computing environment such as a personal computer based Web browser. In some embodiments, appropriate user interfaces are used to provide similar functionality on devices with restricted capabilities such as a mobile phone.

Figure 5:
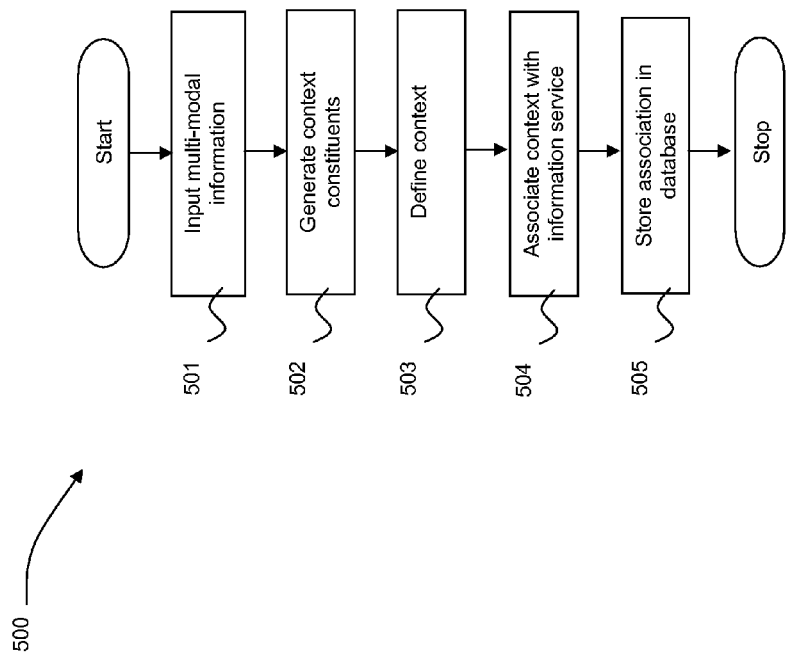
FIG. 5($a$) illustrates an exemplary process for associating information services with contexts, in accordance with an embodiment.
Figure 5:
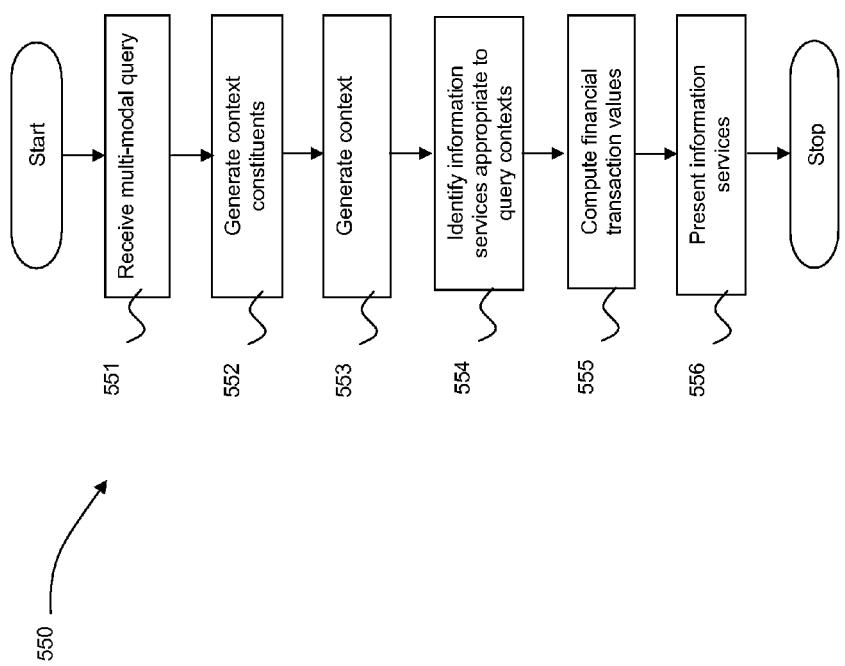

FIG. 5(*a*) illustrates an exemplary process 500 for setting up transactions in the system i.e., for associating information services with contexts. Process 500 and other processes of this document are implemented as a set of modules, which may be process modules or operations, software modules with associated functions or effects, hardware modules designed to fulfill the process operations, or some combination of the various types of modules. The modules of process 500 and other processes described herein may be rearranged, such as in a parallel or serial fashion, and may be reordered, combined, or subdivided in various embodiments. Here, a user of the system inputs multimodal information (501).

The system then generates context constituents from the multimodal input information (502). Generation of the context constituents may involve the analysis of the multimodal input information for the extraction of embedded implicit data. The user may then define a context from the set of context constituents (503). The user can then associate an information service with the context (504).

In some embodiments, the user may specify a context directly using the multimodal inputs. However, in that case, the system may internally use implicit data embedded in the multimodal input. Upon submitting the information for the context-information service association, the system creates an entry in the context-information service mapping table in the marketplace database for the association (505). A corresponding entry for the context may also be created in the context definition table in the marketplace database.

Users of the system creating such associations may be providers of information services, consumers of information services, operators of the system, owners of sources of context constituents, owners of sources of content or other third parties. In some embodiments, instead of entering the context, a user may search using appropriate queries (e.g., textual keywords) and select a preexisting context in the marketplace database and associate an information service with it. Further, the contexts may be entered manually into the system or generated by other information systems (e.g., web crawler, system providing information services related to visual imagery) connected to the marketplace.

As in the case of context-information service associations, the contexts may be manually entered into the system by providers of information services, consumers of information services, operators of the system, owners of sources of context constituents, owners of sources of content or other third parties. Also, in some embodiments, the association of the information services with contexts may be performed automatically by the system based on guiding criteria specified by the users or operators of the system. Further, the context definitions and context-information service mapping in the marketplace database may also be modified or deleted after creation using the management user interface 400.

A consumer of the marketplace may access the system and request information services relevant to a specific context. The system then provides a list of one or more information services relevant to the context accompanied by the value of the associated financial transactions if any, in case of commercial information services. The value of the financial transaction associated with a commercial or sponsored information service provided on a fixed price pricing model is the specified fixed price. In case of commercial or sponsored information services specifying a dynamic pricing model, an automatic bidding process is used to compute the value of the associated financial transaction. The value of the financial transaction may also be used as a factor in computing the priority for providing the information service to the consumer.

FIG. 5(b) illustrates an exemplary process 550 for providing information services to a consumer. Process 550 is initiated by the system receiving a query for information services (551). In some embodiments, the query may be in the form of a simple textual query which is used to generate context constituents. In some embodiments, the query may be in the form of multimodal information including metadata. In such embodiments, the multimodal information may be analyzed by the system to generate implicit data to form the complete set of context constituents (552). The context constituents are then used to generate contexts (553) which are then used to identify appropriate information services in the marketplace database (554).

The identification of information services appropriate to a context generated from the query may involve the matching of the context generated from the query to contexts in the marketplace database. In some embodiments, partial matches may also be identified as appropriate to the query. Optionally, any financial transactions associated with the information services may also be computed (555). The identified information services are then presented to the query initiator that may be a user or another information system (e.g., system for providing information services related to visual imagery) along with any accompanying financial transaction values, if any (556).

In one embodiment using an auction based dynamic pricing model for computing the financial transaction value of sponsored information services, a provider specifies the maximum price that he is willing to pay for associating an information service with a specific context. In addition, the operator of the system may optionally specify a minimum financial transaction value for associating information services with contexts. Then, when the specific context is used by a consumer to request relevant information services, if only a single information service is associated with the specific context, the value of the financial transaction associated with the information service is set at the minimum financial transaction value specified by the operator of the system.

However, if a plurality of information services is associated with a specific context and each information service is associated with a financial transaction value, then the financial transaction value of each of the information services associated with the context is computed in conjunction with the financial transaction value of the other information services associated with the context using a forward auction model. In such a scenario, the financial transaction value of all information services that specify a fixed price pricing model is set at the specified fixed price.

For information services that specify a dynamic pricing model, the financial transaction value of each such information service is set at a value that is greater than that of all other information services associated with the context provided the value is less than or equal to the maximum price the provider of the information service is willing to pay for associating the information service with the context.

If the maximum price a provider is willing to pay for associating one information service with a context is less than the maximum price the same or another provider is willing to pay for associating a second information service with a context, then financial transaction value of the first information service is set at the maximum financial transaction value specified for the first information service. Once the financial transaction value associated with all the information services associated with a specific context is determined using the above criteria, the list of information services and their associated financial transaction values may be presented to the consumer.

Figure 6A:
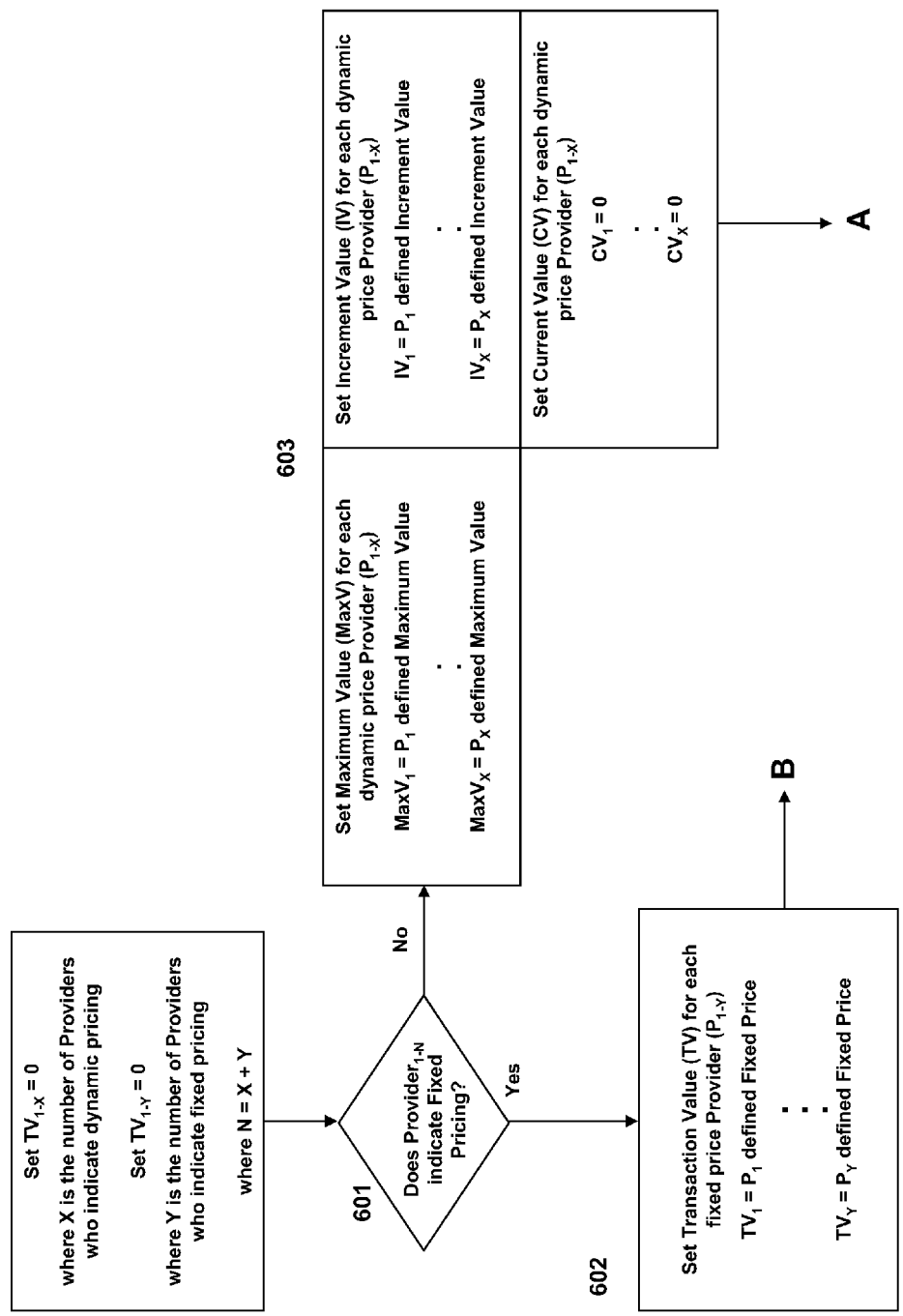
FIGS. 6A and 6B illustrate an exemplary process for computing the financial transaction value for sponsored information services, in accordance with an embodiment.
Figure 6B:
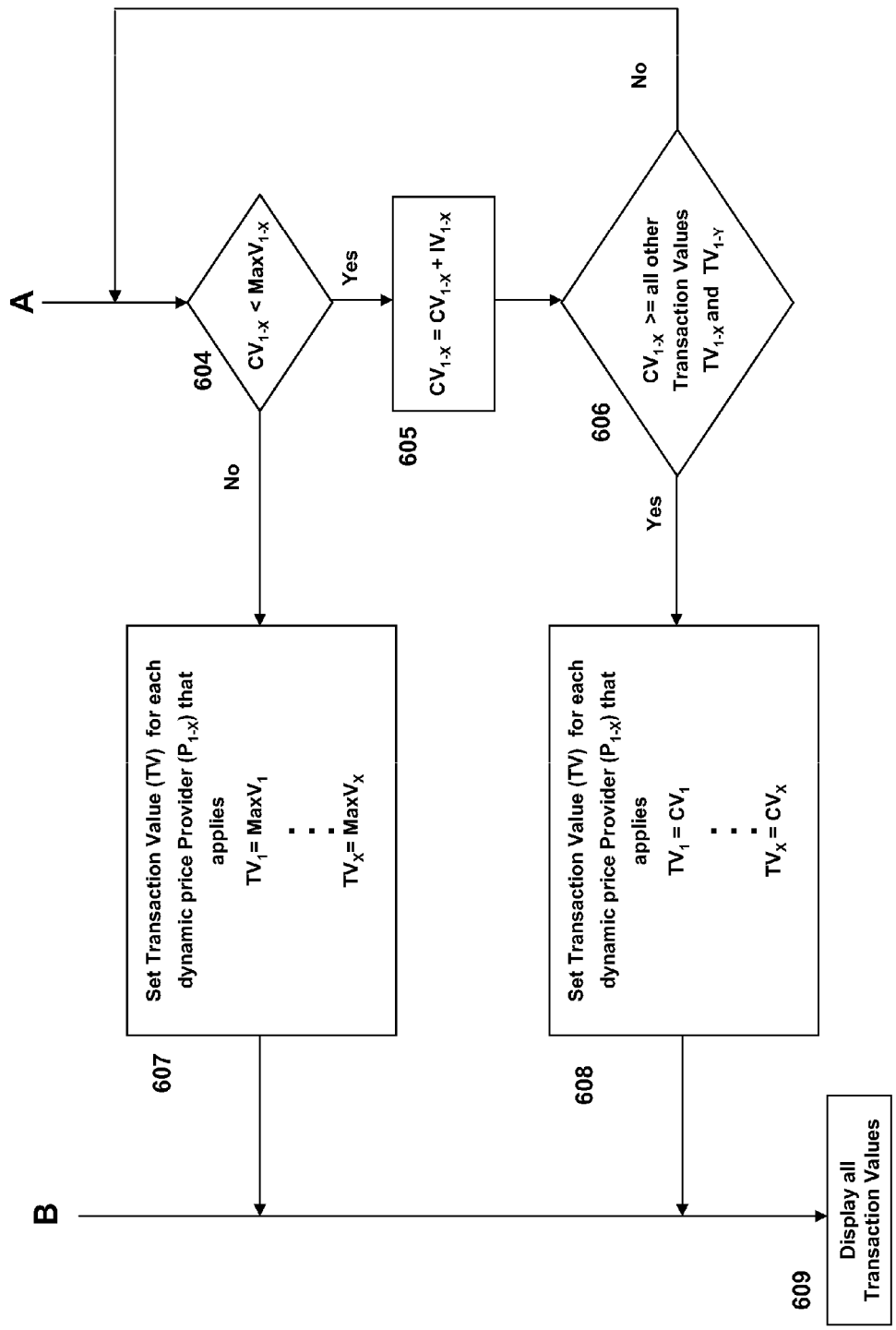

FIGS. 6A and 6B illustrate an exemplary process for this scenario. In the figure, the maximum price a provider is willing to pay for associating an information service with a context is termed "maximum value" and the intermediate financial transaction value as it is being computed is termed "current value." The value by which the intermediate financial transaction value is incremented during the computation of the financial transaction value is termed the "increment value." The value of increment value is specified either by the provider of the information service or by the operators of the system.

To describe the sequence of operations of the process, if a fixed price model is specified for an information service (601), the financial transaction value is assigned the fixed price specified (602). If a dynamic pricing model is specified, then the current value is incremented (605) by the specified increment value starting from zero (603) until either 1) the maximum value specified is reached (604) or 2) the current value is greater than the financial transaction value computed for all other information services available for association with a context (606). In case the maximum value specified is reached, the financial transaction value is assigned the specified maximum value (607). In case the maximum value specified is not reached but the current value is greater than the financial transaction value computed for all other information services available for association with a context, the financial transaction value is assigned the current value (608). This process may be performed iteratively on all information services available for association with a context to compute the final financial transaction values (609) for all the information services.

In one embodiment of the system based on a reverse auction model, a consumer specifies a maximum value he is willing to pay for obtaining commercial information services relevant to a specific context. In such a scenario, the producers of the information service specify a minimum price for which they are willing to provide the information service, using a fixed price or dynamic pricing model. Then, the system computes the financial transaction value of information services that specify a fixed price pricing model as the specified fixed price.

If a plurality of information services specifying a dynamic pricing model are available for association with a context, the financial transaction value is computed such that it is less than that of all other information services available for association with the context, provided it is greater than or equal to the minimum value specified by the provider of the information service. If the minimum price a provider is willing to accept for providing one information service in association with a context is greater than the minimum price the same or another provider is willing to pay for associating a second information service with a context, then the financial transaction value of the first information service is set at the minimum specified value specified for the first information service. Once the financial transaction value associated with all the information services available for association with a specific context is thus determined, the list of information services and their associated financial transaction values are presented to the consumer.

Figure 7A:
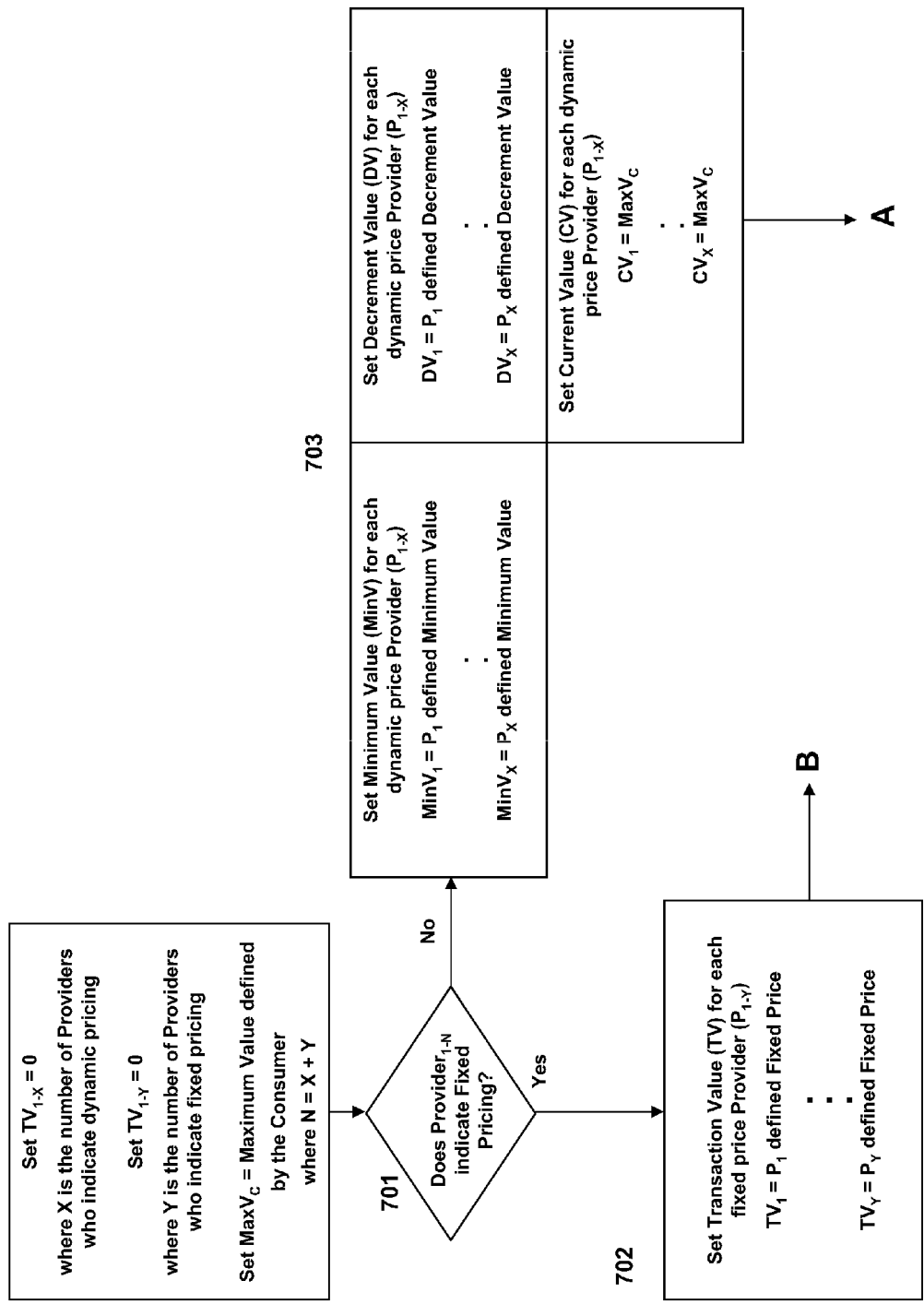
FIGS. 7A and 7B illustrate an exemplary process for computing the financial transaction for commercial information services, in accordance with an embodiment.
Figure 7B:
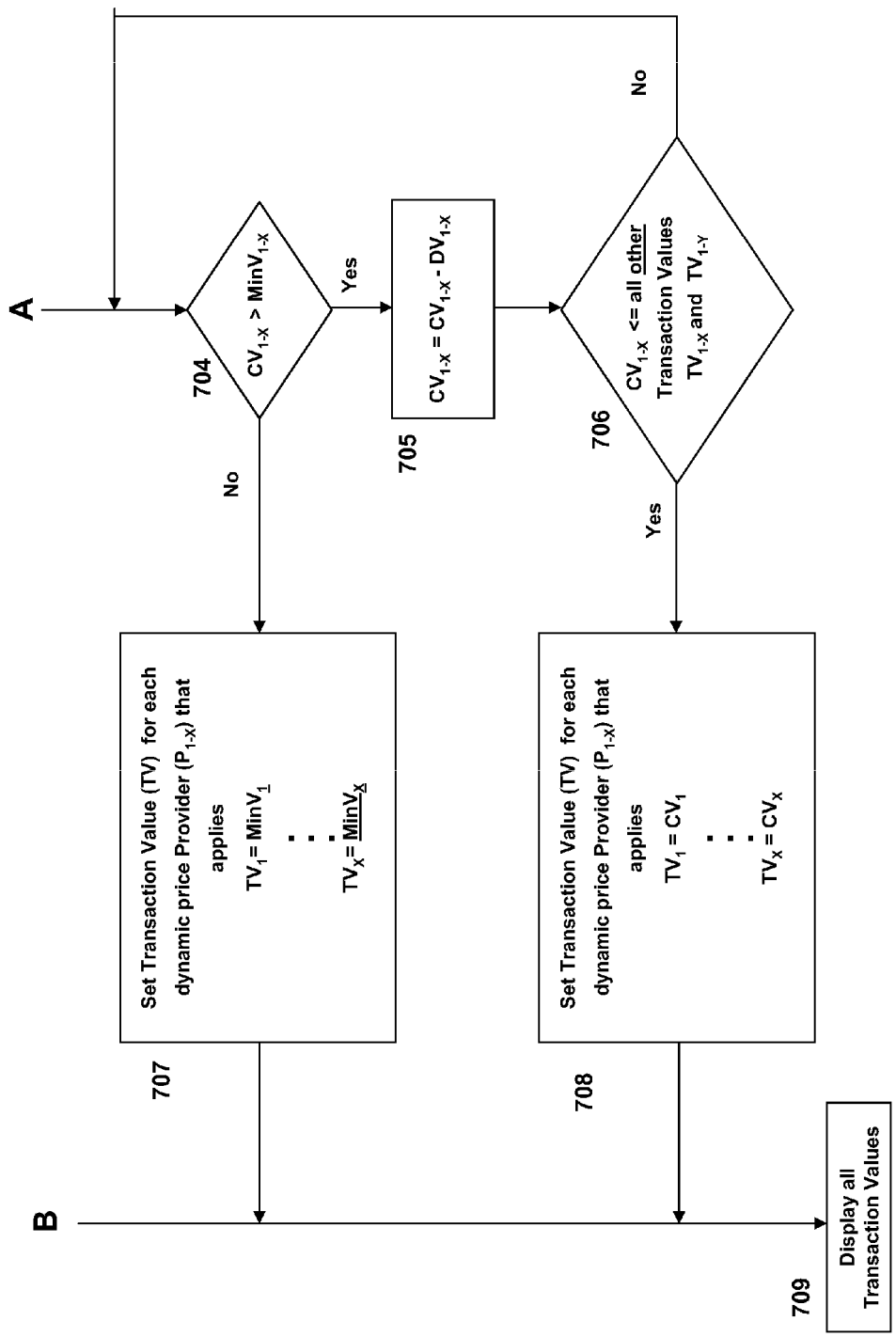

FIGS. 7A and 7B illustrate an exemplary process for this scenario. In the figure, the minimum price a provider is willing to provide an information service for is termed "minimum value" and the intermediate financial transaction value as it is being computed is termed "current value." The value by which the intermediate financial transaction value is decremented during the computation of the financial transaction value is termed the "decrement value." The value of decrement value is specified either by the provider of the information service or by the operators of the system.

To describe the sequence of operations of the process, if a fixed price model is specified for an information service (701), the financial transaction value is assigned the fixed price specified (702). If a dynamic pricing model is specified, then the current value is decremented (705) by the specified decrement value starting from an initial value (703) specified by the provider of the information service until either 1) the minimum value specified is reached (704) or 2) the current value is less than the financial transaction value computed for all other information services available for association with a context (706).

In case the minimum value specified is reached, the financial transaction value is assigned the specified minimum value (707). In case the minimum value specified is not reached but the current value is less than the financial transaction value computed for all other information services available for association with a context, the financial transaction value is assigned the current value (708). This process may be performed iteratively on all information services available for association with a context to compute the final financial transaction values for all the information services (709).

The financial transaction value thus computed for the information services in the marketplace may be used as one of the factors for computing the relevancy of information services to a specific context.

The operators of the system may also charge a service fee for operating the marketplace using a fixed price or dynamic pricing model. When the dynamic pricing model is used, an process similar to the auction process described for the sponsored information services may be used. However, while the auction process described for the sponsored information services uses a single variable, i.e. the price the providers of the sponsored information service are willing to pay to offer the sponsored information service, the dynamic pricing model for the service fee uses a plurality of parameters as enumerated earlier and hence the decision criteria for varying the intermediate service fee in the process is more complex. In this case, the intermediate service fees are modified such that they satisfy not only the minimum or maximum price criteria but also the limits specified for the other enumerated parameters used in computing the service fee.

Figure 8:
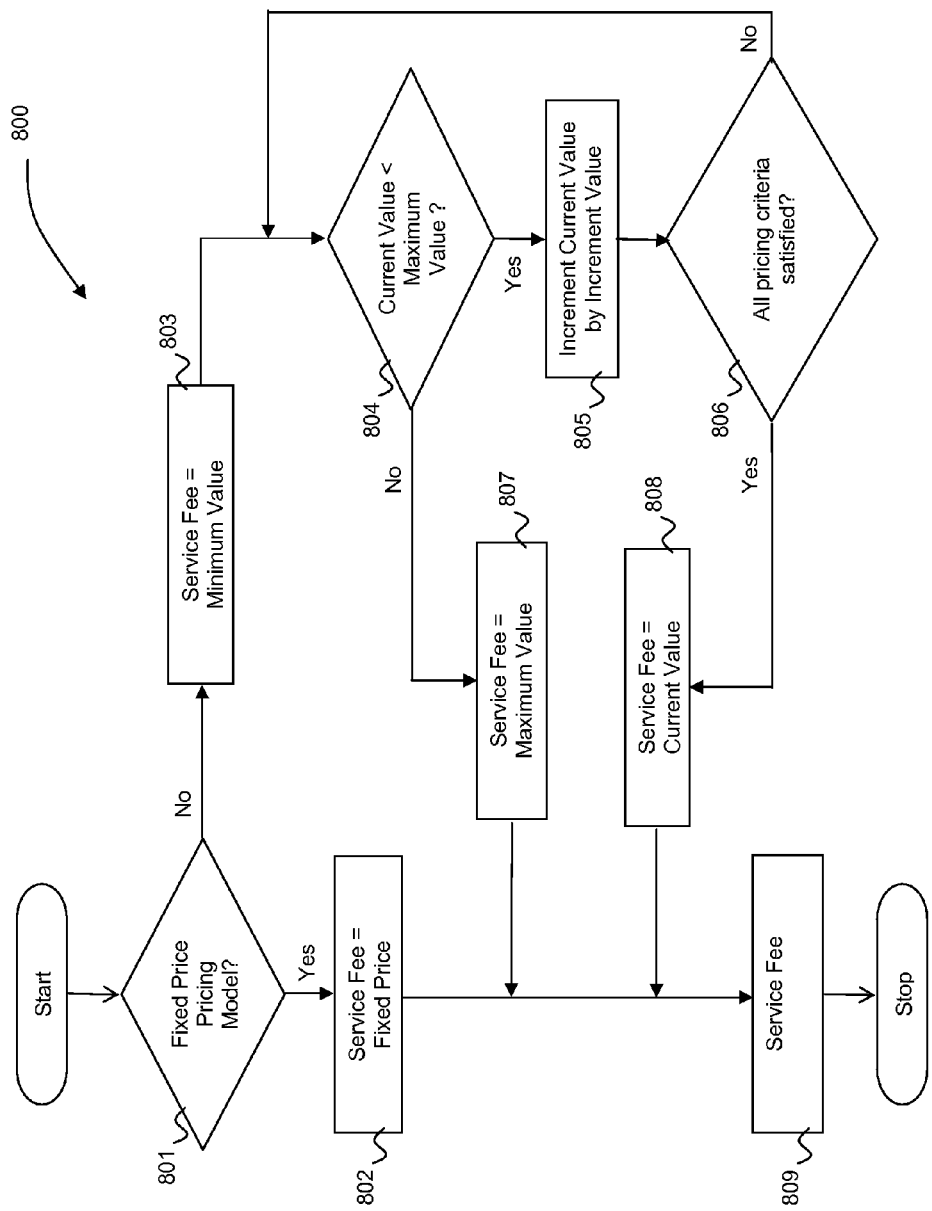
FIG. 8 illustrates an exemplary process for computing the service fee for providing information services, in accordance with an embodiment.

FIG. 8 illustrates an exemplary process for computing the service fee. In the figure, the minimum service fee charged by the operator of system for providing an information service is termed "minimum value" and the intermediate service fee value as it is being computed is termed "current value." The value by which the intermediate service fee value is incremented during the computation of the service fee value is termed the "increment value." The value of increment value may be specified by the operators of the system.

To describe the sequence of operations of the process, if a fixed price model is specified for an information service (801), the service fee is assigned the fixed price specified (802). If a dynamic pricing model is specified, then the current value is incremented by the specified increment value (805) starting from a system operator specified minimum value (803) until either 1) a system operator specified maximum value specified is reached (804) or 2) the current value is greater than the service fee computed for all other information services available for association with a context based on the various decision criteria enumerated earlier (806). In case the maximum value specified is reached, the service fee is assigned the specified maximum value (807).

In case the maximum value specified is not reached but the current value is greater than the service fee computed for all other information services available for association with a context, the service fee is assigned the current value (808). This process may be performed iteratively on all information services available for association with a context to compute the final service fees for all the information services (809).

Besides, the operators of the system may also compensate providers of context constituents that are used to generate the contexts used to access the information services using a fixed price or dynamic pricing model. When a dynamic pricing model is used, an process similar to the auction process described for the sponsored information services is used.

However, it is to be noted that while the auction process described for the sponsored information services uses a single variable, i.e., the price the providers of the sponsored information service are willing to pay to offer the sponsored information service, the dynamic pricing model for the compensation paid to the providers of context constituents uses a plurality of parameters as enumerated earlier and hence the decision criteria for varying the intermediate compensation values in the process is more complex. In this case, the intermediate compensation values are modified such that they satisfy not only any minimum or maximum price criteria but also the limits specified for the other enumerated parameters used in computing the compensation value.

Figure 9:
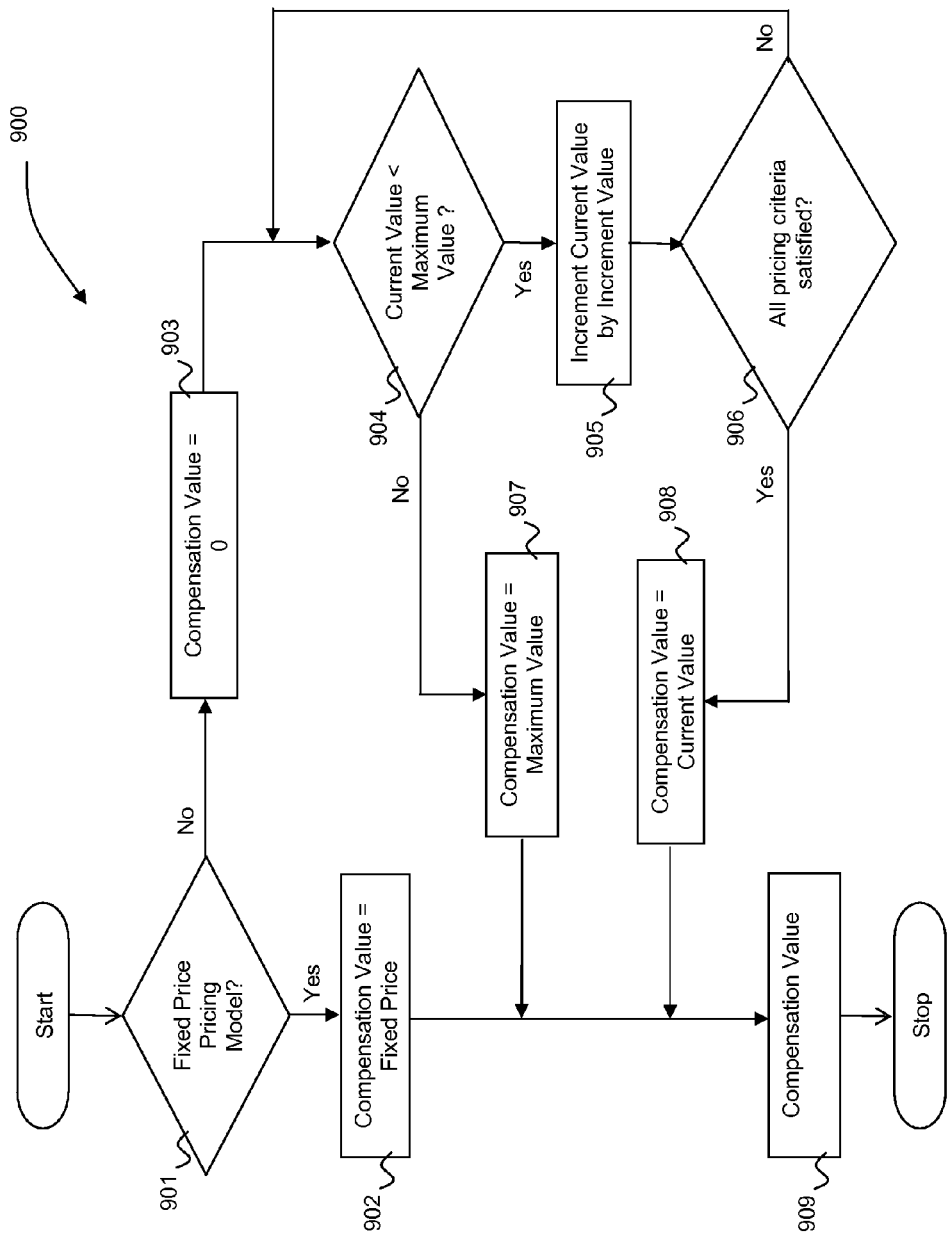
FIG. 9 illustrates an exemplary process for computing the compensation for providers of context constituents, in accordance with an embodiment.

FIG. 9 illustrates an exemplary process for computing the compensation value. In the figure, the intermediate compensation value as it is being computed is termed "current value." The value by which the intermediate compensation value is incremented during the computation of the compensation value is termed the "increment value." The value of the increment value may be specified by the operators of the system.

To describe the sequence of operations of the process, if a fixed price model is specified for an information service (901), the compensation value is assigned the fixed price specified (902). If a dynamic pricing model is specified, then the current value is incremented (905) by the specified increment value starting from zero (903) until either 1) a system operator specified maximum value is reached (904) or 2) the various criteria enumerated earlier are met (906).

In case the system operator specified maximum value specified is reached, the compensation value is assigned the specified maximum value (907). In case the maximum value specified is not reached but all the pricing criteria are satisfied, the compensation value is assigned the current value (908). This process may be performed iteratively on all context constituents associated with a context to compute the final compensation value for all the context constituents (909).

In some embodiments, users of the system may optionally be billed for use of the marketplace cumulatively over a period of time such as monthly or annually. In some embodiments, users of the system may also be optionally billed a subscription fee for the privilege of accessing the system.

Figure 10:
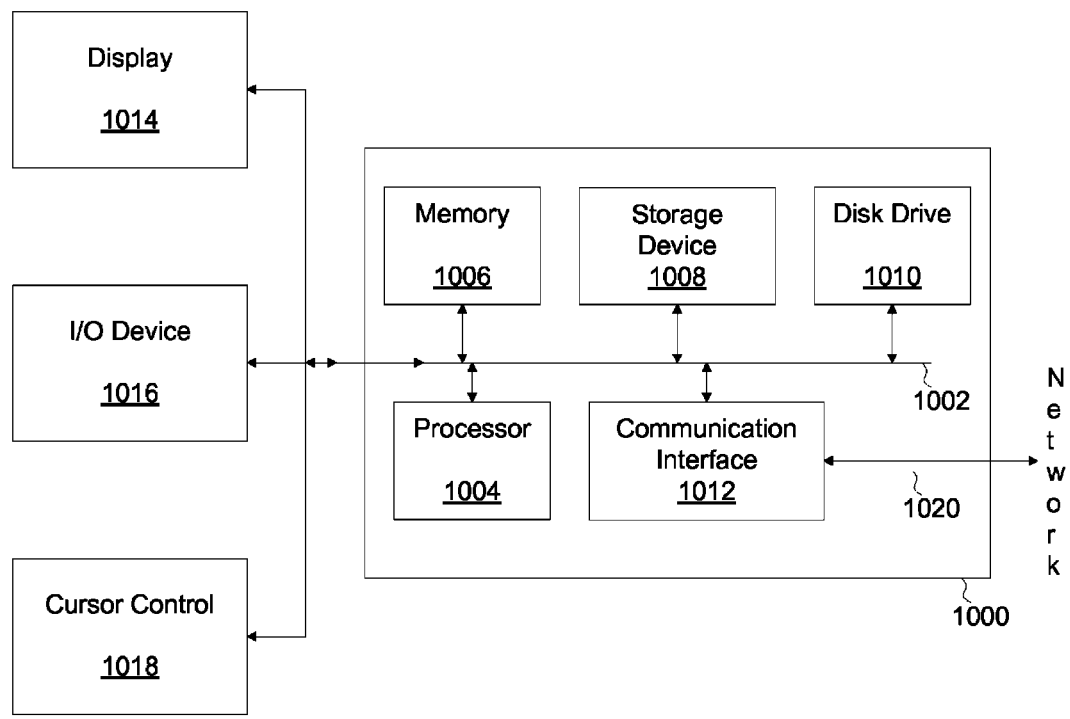
FIG. 10 is a block diagram illustrating an exemplary computer system suitable for operating a marketplace for rights to associate information services with multimodal contexts, in accordance with an embodiment.

FIG. 10 is a block diagram illustrating an exemplary computer system suitable for hosting the marketplace. In some embodiments, computer system 1000 may be used to implement computer programs, applications, methods, or other software to perform the above-described techniques for operating a multimodal context marketplace.

Computer system 1000 includes a bus 1002 or other communication mechanism for communicating information, which interconnects subsystems and devices, such as processor 1004, system memory 1006 (e.g., RAM), storage device 1008 (e.g., ROM), disk drive 1010 (e.g., magnetic or optical), communication interface 1012 (e.g., modem or Ethernet card), display 1014 (e.g., CRT or LCD), input device 1016 (e.g., keyboard), and cursor control 1018 (e.g., mouse or trackball).

According to some embodiments, computer system 1000 performs specific operations by processor 1004 executing one or more sequences of one or more instructions stored in system memory 1006. Such instructions may be read into system memory 1006 from another computer readable medium, such as static storage device 1008 or disk drive 1010. In some embodiments, hard-wired circuitry may be used in place of or in combination with software instructions to implement the system.

The term "computer readable medium" refers to any medium that participates in providing instructions to processor 1004 for execution. Such a medium may take many forms, including but not limited to, nonvolatile media, volatile media, and transmission media. Nonvolatile media includes, for example, optical or magnetic disks, such as disk drive 1010. Volatile media includes dynamic memory, such as system memory 1006. Transmission media includes coaxial cables, copper wire, and fiber optics, including wires that comprise bus 1002. Transmission media may also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer may read.

In some embodiments, execution of the sequences of instructions to practice the system is performed by a single computer system 1000. According to some embodiments, two or more computer systems 1000 coupled by communication link 1020 (e.g., LAN, WAN, PSTN, or wireless network) may perform the sequence of instructions to practice the system in coordination with one another. Computer system 1000 may transmit and receive messages, data, and instructions, including program, i.e., application code, through communication link 1020 and communication interface 1012. Received program code may be executed by processor 1004 as it is received, and/or stored in disk drive 1010, or other nonvolatile storage for later execution.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of associating a multimodal context with one or more transaction values, the method comprising:

making a multimodal context available for display at one or more service provider computer systems over a computer network by a marketplace computer, wherein the multimodal context is generated from multimodal information comprising at least two multimedia data types, the multimodal information comprising metadata and information extracted from the at least two multimedia data types;

receiving by the marketplace computer from the one or more service providers an indication associated with the multimodal context, said indication comprising:
  a provider's fixed price value, or
  a provider's maximum value willing to pay and the provider's auction incrementing value, or a provider's minimum value willing to accept and the provider's auction decrementing value;

determining a transaction value, associated with the multimodal context, by the marketplace computer for each service provider comprising:

for each received indication being a fixed price value, setting the provider's transaction value to the provider's fixed price value;

for each received indication being a maximum value and auction incrementing value for a sponsorship model, executing an automatic auction, wherein the automatic auction determines a transaction value for each provider further comprising:

for conditions that apply, setting the provider's transaction value to the provider's maximum value; and for conditions that apply, setting the provider's transaction value to a current iterative value; and for each received indication being a minimum value and auction decrementing value for a reverse auction model, executing an automatic auction, wherein the automatic auction determines a transaction value for each respective provider further comprising:

for conditions that apply, setting the provider's transaction value to the respective provider's minimum value; and for conditions that apply, setting the provider's transaction value to a current iterative value;

when the sponsorship model is indicated, displaying all transaction values associated with the multimodal context for the sponsorship model, and not the reverse auction model; and when the reverse auction is indicated, displaying all transaction values associated with the multimodal context for the reverse auction model, and not the sponsorship model.

2. The method of claim 1 wherein the multimodal information comprises information extracted from a visual image.

3. The method of claim 1 wherein the multimodal information comprises information extracted from a video.

4. The method of claim 1 wherein the multimodal information comprises information extracted from an audio track.

5. The method of claim 1 wherein the multimodal information comprises information extracted from a video and an audio track associated with the video.

6. The method of claim 1 wherein the metadata extracted comprises a time stamp.

7. The method of claim 1 wherein one of the at least two multimedia data types which can be being handled comprises an image.

8. The method of claim 1 wherein one of the at least two multimedia data types which can be handled comprises an audio type.

9. The method of claim 1 wherein one of the at least two multimedia data types which can be handled comprises a video type.

10. The method of claim 1 comprising:

generating a graphical user interface on a computer screen comprising:

a first portion of a window to display on a computer screen context information extracted from an image, the context information comprising text identifying an object in the image, a first input box of the window to input a URL of an information service to be associated with the context information, a second input box of the window to input a price to pay for associating the information service to the context information, and a button to submit the URL and the price to the marketplace system.

11. The method of claim 1 wherein the at least two multimedia data types which can be handled comprise at least audio and visual information.

12. The method of claim 1 wherein the at least two multimedia data types which can be handled comprise at least still image and video sequence information.

13. The method of claim 1 wherein the at least two multimedia data types which can be handled comprise at least graphical and textual information.

14. The method of claim 1 wherein the at least two multimedia data types which can be handled comprise at least still image and audio speech information.

15. The method of claim 1 wherein the at least two multimedia data types which can be handled comprise at least audio and textual information.

16. The method of claim 1 wherein the at least two multimedia data types which can be handled comprise at least visual and textual information.

17. The method of claim 1 wherein the multimodal context generated at a server.

18. The method of claim 1 wherein the multimodal information is submitted via a mobile phone.

19. The method of claim 1 wherein the multimedia data types are submitted via a mobile phone.

20. The method of claim 1 wherein the multimodal information comprises visual data submitted via a mobile phone.

* * * * *